United States Patent [19]

Chow

[11] Patent Number: 5,164,610
[45] Date of Patent: Nov. 17, 1992

[54] METHOD AND APPARATUS FOR TRANSMITTING ELECTRICAL ENERGY TO A MOVING DEVICE BY MEANS OF CAPACITIVE COUPLING

[76] Inventor: Shing C. Chow, 12A Suffolk Road, Kowloon Tong, Kowloon, Hong Kong

[21] Appl. No.: 818,066

[22] Filed: Jan. 8, 1992

[51] Int. Cl.⁵ .............................................. H02J 3/06
[52] U.S. Cl. .................................................... 307/149
[58] Field of Search ............... 361/287, 290, 207, 292; 307/112, 109, 142, 149; 310/307, 42, 306, 48

[56] References Cited

U.S. PATENT DOCUMENTS

| 392,213 | 11/1888 | McElroy | 323/304 |
|---|---|---|---|
| 393,073 | 11/1888 | McElroy et al. | 323/304 |
| 1,910,434 | 5/1933 | Hayes | 310/309 |
| 2,142,633 | 1/1939 | Dey et al. | 40/130 |
| 2,610,994 | 9/1952 | Bosch et al. | 171/329 |
| 3,210,643 | 10/1965 | Else et al. | 322/2 |
| 3,443,225 | 5/1969 | Moorhead | 324/76 |
| 3,609,957 | 10/1971 | Emerson et al. | 58/23 |
| 4,803,379 | 2/1989 | Remigio et al. | 307/112 |
| 4,943,750 | 7/1990 | Howe et al. | 310/309 |

Primary Examiner—A. D. Pellinen
Assistant Examiner—Aditya Krishnan
Attorney, Agent, or Firm—Knobbe, Martens, Olson & Bear

[57] ABSTRACT

An apparatus for coupling AC electrical energy from a stationary source to a moving electrical device includes an input for receiving a source of AC electrical energy. The apparatus also includes a stationary, electrically-conductive plate and a moveable, electrically-conductive plate which is proximate to the stationary plate. A power consuming electrical device is electrically connected to the moveable plate. The invention couples energy from the AC source to the power consuming device by means of a capacitive link established between the stationary plate and the moveable plate. In preferred embodiments of the invention, the power consuming device comprises a neon tube or an electrical motor.

6 Claims, 2 Drawing Sheets

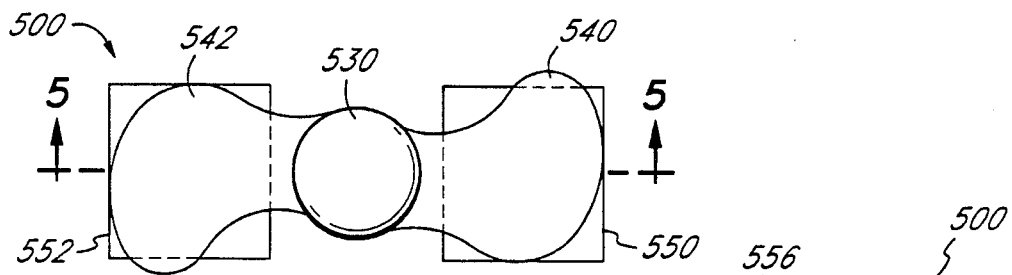
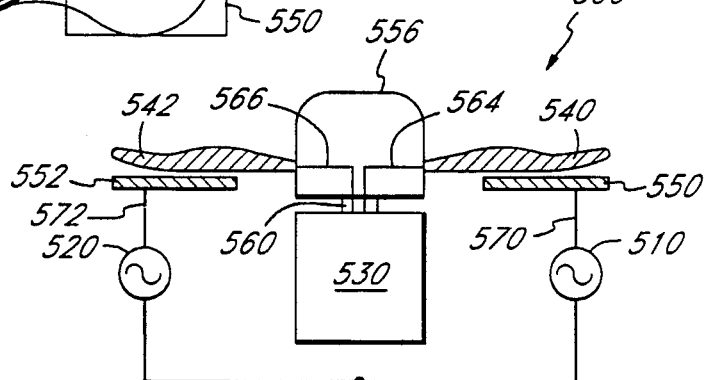
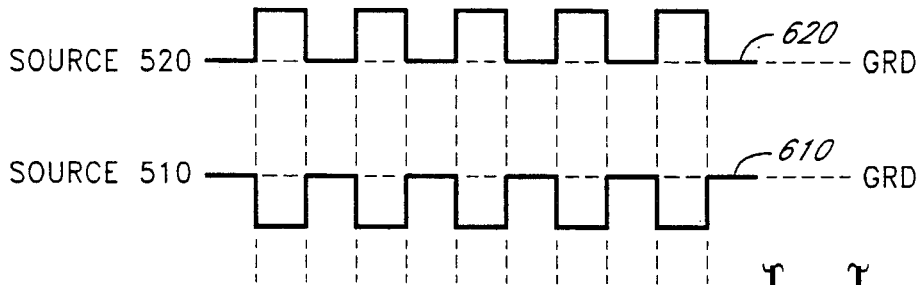
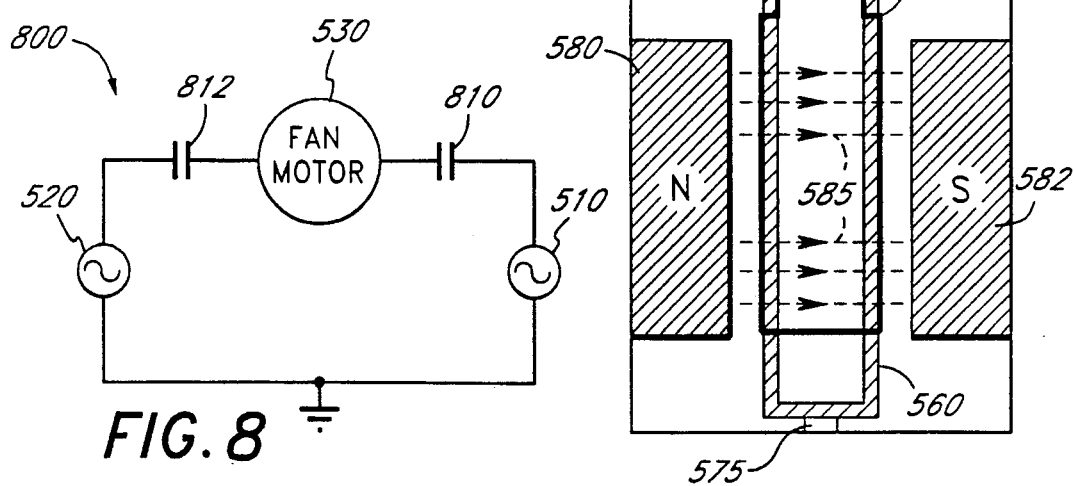
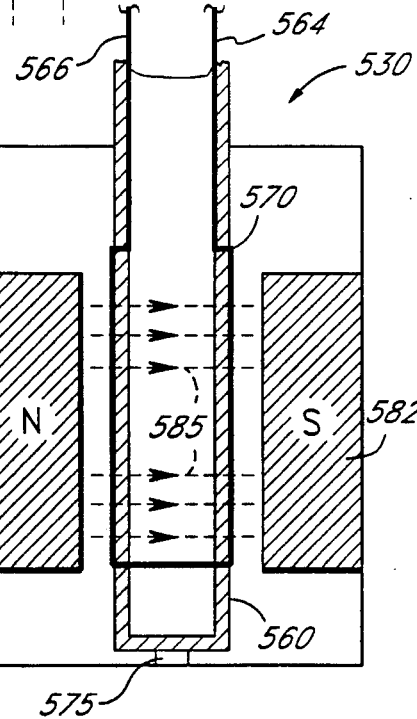

METHOD AND APPARATUS FOR TRANSMITTING ELECTRICAL ENERGY TO A MOVING DEVICE BY MEANS OF CAPACITIVE COUPLING

BACKGROUND OF THE INVENTION

1. Field of the Invention

The present invention relates to devices which transmit electrical energy from a stationary source to a moving device.

2. Description of the Related Art

A number of devices have been made which couple electrical energy from a transmitting terminal to a receiving terminal of an electrical device. This has been accomplished with relative ease in devices where both the source and receiving device remain stationary with respect to one another. For example, in one previous system, energy is radiated at high frequencies from a conductive plate proximate to a gaseous conduction tube. The energy radiated from the plate excites the gas within the tube so that the gas within the tube is illuminated.

In some electrical devices, however, it is desirable that electrical energy be transmitted from a stationary electrical source to a moving device. For example, in many electrical generators and motors it is necessary to couple electrical energy from a rotating device which carries electrical current to a stationary voltage output terminal. This is typically accomplished by means of conductive carbon brushes or the like interacting with a rotating ring or a commutator, for example. In this fashion, current generated by rotating a conductor through a magnetic field may be transmitted to a stationary electrical circuit.

However, it has been found that, in certain applications, disadvantages are associated with coupling electrical energy from a stationary source to a moveable device by means of a conductive contact (e.g., a brush or bearing). In particular, these conductive brushes create friction due to their physical contact with the rotating device. This friction results in a loss of energy, thereby reducing the efficiency of the system. In addition, the friction between the conductive contacts of the stationary source and the moving device create wear on both the contacts and the moving device. Thus, it may be necessary to replace those elements of the system which have suffered wear due to friction. Such replacement can often be inconvenient and costly.

Therefore, a need exists for a method and apparatus for coupling electrical energy from a stationary source to a moving device without creating a frictional contact between the source and the moving device.

SUMMARY OF THE INVENTION

The present invention is an apparatus for coupling AC electrical energy from a stationary source to a moving, power-consuming object. The invention includes means for receiving electrical energy from a source of alternating electrical current. It further includes a stationary, electrically-conductive surface which is electrically connected to the means for receiving electrical energy, and a moveable, electrically-conductive surface. The moveable surface is proximate and substantially parallel to the stationary surface so that an electrical capacitance is established between the stationary and the moveable surface. A dielectric material is situated between the stationary and the moveable surface. A power-consuming, electrical device is electrically connected to the moveable surface, and is powered by an alternating electrical current capacitively coupled from the stationary source.

In one preferred embodiment of the invention, the electrical device comprises a rotatable power consuming device such as a neon tube. In this embodiment, electrical energy is capacitively coupled to the neon tube which is rotated by means of a driving device such as a spring clock movement, or an electrical motor. A series electrical circuit is made through the AC power supply, the capacitive link and the driving device, so that the current supplied by the AC source may be used to energize the neon tube.

In another preferred embodiment, the electrical device comprises an electrical motor. In this embodiment, electrical energy is directly coupled to the motor itself so that the energy provided by the AC source is used to cause the motor to rotate. In one embodiment, flat blades which may be used to enhance capacitive coupling are attached to the motor.

The present invention also provides a method for coupling AC electrical energy from a stationary source to a moving, power-consuming object comprising the steps of receiving AC electrical energy from the stationary source of alternating electrical current, and connecting a stationary, electrically-conductive surface to the source of alternating electrical current. The method further comprises the steps of establishing an electrical capacitance between a moveable, electrically-conductive surface and the stationary surface, the moveable surface being proximate and substantially parallel to the stationary surface, situating a dielectric material between the stationary and the moveable plate, and connecting a power-consuming, electrical device to the moveable surface to receive alternating electrical current via the stationary and moveable conductive surfaces.

In one application of the method, the power consuming electrical device comprises a neon tube. In another application of the method, the power consuming electrical device comprises an electrical motor.

BRIEF DESCRIPTION OF THE DRAWINGS

FIG. 4 is a plan view of the DC fan motor embodiment of the invention.

FIG. 5 is a schematic cross-sectional elevational view, taken along the lines 5—5 in FIG. 4, showing the major functional elements of the DC motor embodiment of the invention.

FIG. 6 shows the waveshape and relative timing of one possible pair of voltage inputs which may be employed to power the DC motor embodiment.

FIG. 7 is a cross-sectional schematic view of the motor of FIG. 5 showing the major structural elements of the motor.

FIG. 8 is an electrical schematic view showing the equivalent circuit of the DC fan motor embodiment of the invention.

DETAILED DESCRIPTION OF THE PREFERRED EMBODIMENTS

Figure 1:
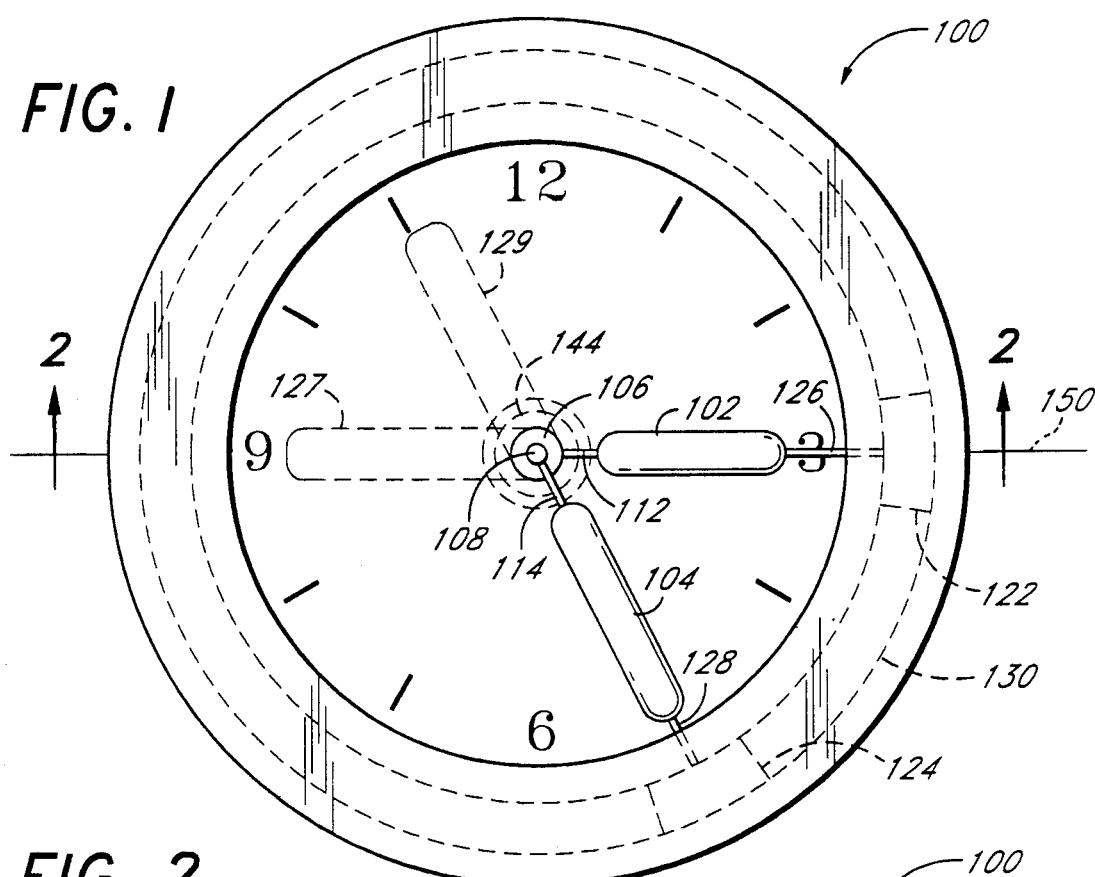
FIG. 1 is a plan view of one embodiment of the present invention which illustrates an electrically powered clock having neon tubes as hands.

A first embodiment of the present invention is described in detail with reference to FIGS. 1-3. The embodiment comprises a clock 100 having a pair of neon tubes 102, 104 which serve as hour and minute hands, respectively. The neon tubes 102, 104 are affixed to shafts 106, 108 at the center of the face of the clock 100, so that the tubes 102, 104 are able to rotate like the hour and minute hands of conventional clocks. AC electrical energy is coupled to the neon tubes 102, 104 from an AC electrical source 160 by means of a capacitive link established between a pair of conductive plates 122, 124, and a conductive ring 130. Thus, the neon tubes can be illuminated by means of the coupled AC electrical energy without the need for a physical, frictional contact between the plates 122, 124 and the ring 130 at the perimeter of the clock face.

FIG. 1 is a plan view of one embodiment of the present invention which shows the electrically powered clock 100 having the neon tubes 102, 104 as the hour and minute hands, respectively. The clock 100 is circular in shape, and the hour and minute hands 102, 104 are mechanically connected by arm pieces 112, 114, respectively, to the shafts 106, 108 at the center of the face of the clock 100. Both of the shafts 106, 108 are mechanically connected to separate springs 118, 119 within the clock 100. The springs 118, 119 allow the neon tubes 102, 104 to move independently according to a conventional spring clock movement. A balancing plate 127 and a balancing plate 129 are also attached to the shafts 106, 108, respectively, and serve to balance the weights of the hour and minute hands 102, 104. In one embodiment, the minute hand 104 is situated so that it rotates slightly above the plane of the ring 130, while the hour hand 102 is situated so that it is able to rotate slightly below the plane of the ring 130. The shaft 106 is hollow and a portion of the shaft 108 is situated within the shaft 106, so that the shafts 106, 108 may rotate independently.

The shafts 106, 108 and the arm pieces 112, 114 are made of an electrically conductive material, such as copper or nickel. In one embodiment, portions of the arm pieces 112, 114 are inserted into the inside ends (i.e., the ends facing into the center of the clock face) of the neon tubes 102, 104. Portions of conducting wires 126, 128 may also be attached to the neon tubes 102, 104, respectively, at the outside ends of the tubes 102, 104. It should be noted that there is no necessity for the tubes 102, 104 to be attached to the plates 122, 124 by means of the wires 126, 128. In fact, in one embodiment, it has been found that it is possible to directly connect the plates 122, 124 to the outside surfaces of the tubes 102, 104 without a loss of energy coupling. The arm pieces 112, 114 and the conducting wires 126, 128 are affixed to the tubes 102, 104 so that, if a sufficient voltage is applied across the arm pieces 112, 114 and the wires 126, 128, the gas within the tubes 102, 104 will be excited and illuminate. The conducting wires 126, 128 are electrically connected to the conductive plates 122, 124. Thus, an electrically conductive path is established between the shafts 106, 108 and the conductive plates 122, 124 via the arm pieces 112, 114, the gas within the tubes 102, 104 and the conductive wires 126, 128.

The conductive plate 124 is spaced above the conducting ring 130 (shown in hidden lines in FIG. 1), and the conductive plate 122 is spaced below the ring 130 so that the plates 122, 124 are substantially parallel to the conducting ring 130. The plates 122, 124 are situated so that substantial portions of their respective areas are located proximate to the ring 130. The area of the plates 122, 124 proximate to the ring 130, together with the perpendicular distance between the surface of each of the plates 122, 124 and the surface of the ring 130, is such that an ample electrical capacitance is established between the plates 122, 124 and the ring 130. For example, in one embodiment, the area of the plate 122 proximate to the ring 130 is 1426.8 square mm, the area of the plate 124 proximate to the ring 130 is 1351.2 square mm, and the perpendicular distance between the surface of each of the plates 122, 124 and the surface of the ring 130 is a maximum of 2 mm. Thus, the capacitance between each plate and the ring can be calculated as:

$$C = eA/d \qquad (1)$$

where A is the area of either of the plates 122, 124 proximate to the ring 130, d is the perpendicular distance between the surface of either of the plates 122, 124 and the surface of the ring 130, and e is a constant determined by the effective permittivity of the material between the plates.

Figure 2:
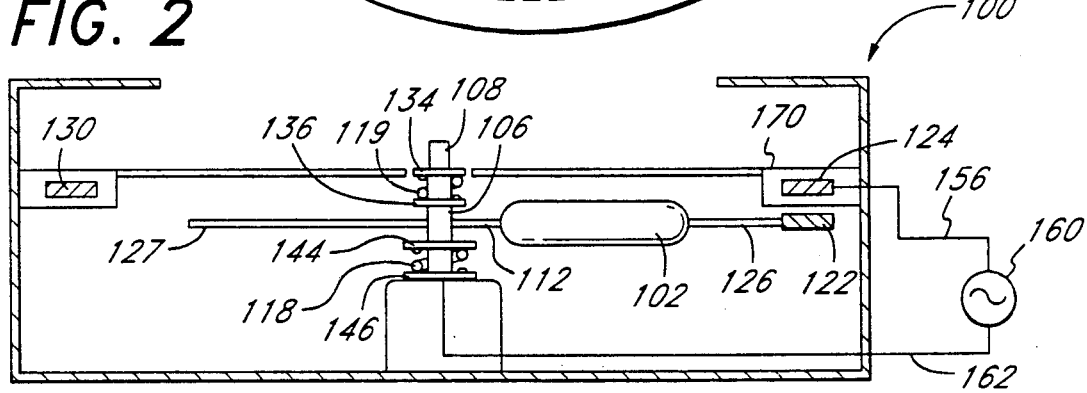
FIG. 2 is a schematic cross-sectional elevational view, taken along the lines 2—2 in FIG. 1, showing the major functional elements of the clock embodiment of the invention.

FIG. 2 is a cross-sectional schematic elevational view taken along a center line 150 (FIG. 1), which shows the major functional elements of the clock embodiment of the invention. As shown in FIG. 2, a lead 156 is electrically connected to the ring 130. The lead 156 is in electrical contact with one output terminal of the AC electrical source 160, and a ground terminal 162 is in electrical contact with the other output terminal of the source 160, so that the output voltage of the source 160 is applied across the lead 156 and the ground terminal 162. Pairs of graphite plates 134, 136, and 144, 146 are shown above and below the springs 119, 118, respectively, so that the graphite plates 134, 136 sandwich the spring 119 and the graphite plates 144, 146 sandwich the spring 118. A conductive path is made through the graphite plates and the springs 118, 119 (as described in detail with reference to FIG. 3) so that the ground terminal 162 is electrically connected to both of the shafts 106, 108. Thus, a complete electrical circuit loop is established when the AC electrical source 160 is connected to the clock 100 by means of the ground terminal 162, and the conductive lead 156. It should be noted, however, that it is possible to capacitively couple the inside ends of the neon tubes 102, 104 so that capacitive connections rather than graphite plates are employed to further reduce frictional contact.

The source 160 may provide a variety of AC waveforms which are capable of exciting gas within a neon tube. For example, in one embodiment, the AC source 160 provides a 1000 V peak-to-peak square wave having a 10%(on)/90%(off) duty cycle. The frequency supplied by the source 160 is advantageously within 100-20,000 Hz. In order to provide a sufficiently high voltage to excite the gas within the neon tubes 102, 104, it may be necessary to employ a voltage transformer (not shown) to increase the voltage level of the output from the AC source 160. This is especially useful when it is desired to employ a conventional wall outlet as the source of AC electrical energy.

An insulating cover 170 which encases the conductive ring 130 is also shown in FIG. 2. The insulating cover 170 may be made of a variety of insulating materials, and the permittivity of the insulating material is advantageously selected to provide a desired capacitance between the plates 22, 124, and the ring 130. In this manner, the insulating cover 170 acts as a dielectric between the conductive surfaces of the plate 122 and the ring 130. Thus, the plate 122 and ring 130, having a maximum of 2 mm of air and the insulating cover 170 interposed between them as dielectrics, may be represented as a capacitor within an equivalent electrical circuit.

Figure 3:
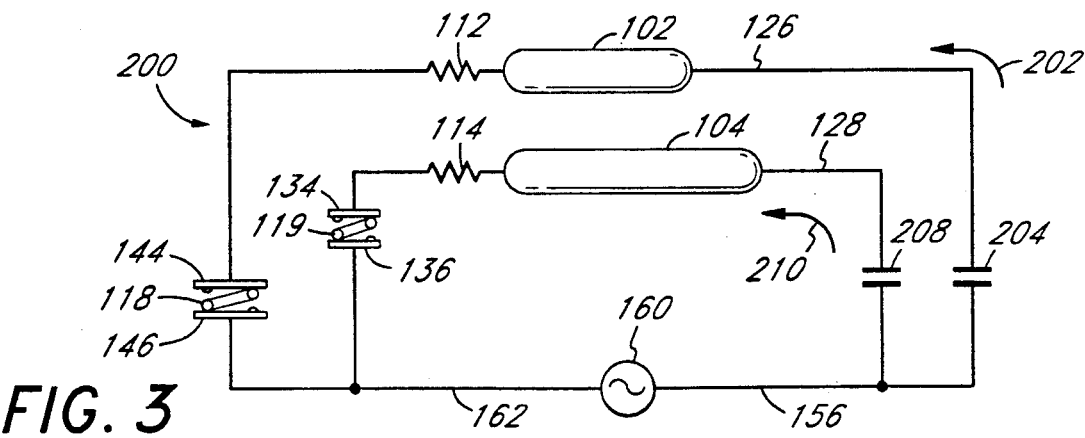
FIG. 3 is an electrical schematic view showing the equivalent circuit of the clock embodiment of the invention.

FIG. 3 shows an equivalent electrical circuit 200 for the electrical elements of the clock embodiment of the invention. As shown in FIG. 3, the equivalent circuit 200 comprises two electrical paths, which are in parallel with one another, established across the source 160. A first path (indicated by an arrow 202) includes an effective capacitor 204 in series with the neon tube 102. The neon tube 102 is further in series with the arm 112, which is schematically represented here as an equivalent resistor 112. In certain embodiments, the arm 112 (as well as the arm 114) may include carbon within it's material, so that the arm 112 may act as a conductive brush against the graphite plate 144. In these embodiments, the arm 112 may have a significant resistance, and is thus represented by an equivalent resistance in the loop 202. The resistor 112 is in series with the graphite plate 144, the spring 118, and the graphite plate 146. Each of the plates 144, 146 typically has a measurable low resistance, and the spring 118 may exhibit a small inductance. A second path (indicated by an arrow 210) includes an effective capacitor 208 in series with the neon tube 104, in series with the minute arm (represented by the resistor 114). The resistor 114 is further in series with the graphite plate 134, the spring 119, and the graphite plate 136. The plates 134, 136 and the spring 119 have substantially the same electrical characteristics as the plates 14, 146 and the spring 118.

The capacitors 204, 208 comprise the plates 122, 124 and the ring 130, respectively. Thus, the effective capacitances of the capacitors 204, 208 may be calculated using equation (1) as detailed above with reference to FIG. 1, where the permittivity, e, of the dielectric may be calculated as a function of the permittivity of air and the permittivity of the insulating cover 170. The neon tubes 102, 104 have an effective impedance which varies as a function of the frequency and amplitude of the voltage applied across the ends of the tubes 102, 104. Thus, the neon tubes 102, 104 act as variable resistors which vary with the frequency of the signal output from the source 160. The appropriate voltage necessary for energizing the neon gas within the tubes 102, 104 will depend upon the dimensions of the neon tubes 102, 104 and their corresponding volumes of neon gas, and will be known to those skilled in the art.

The clock embodiment of the invention shown in FIGS. 1-3 therefore provides a device which efficiently couples AC electrical energy from the source 160 to the neon tubes 102, 104 while reducing the number of physical, frictional contacts between the source 160 and the tubes 102, 104. It should be noted as well, that it is possible to construct the clock embodiment of the present invention so that there are no frictional contacts for the transfer of energy. In such an embodiment, the graphite plates would be replaced with a pair of capacitive plates so that one of the capacitive plates was stationary while the other plate moved with the shaft that it was attached to. Similarly, a variety of modifications to the present invention which may be contemplated by those skilled in the art should be construed to fall within the scope of the teachings of the present invention.

As detailed above, the capacitive coupling procedure for transferring electrical energy from a stationary object (e.g., the conductive ring 130) to a movable object may be used to energize a power consuming device (e.g., the neon tube 102) which is moved by another source of energy. It has also been found that the teachings of the present invention may be applied to other power consuming devices such as motors and the like. Thus, the energy which is capacitively coupled to the device also causes the device to move. FIGS. 4-8 illustrate the basic elements of an alternative embodiment of the present invention. The embodiment comprises a fan 500 which is powered by means of AC electrical energy supplied by two sources 510, 520. The AC electrical energy is capacitively coupled to a DC fan motor 530 by means of the effective capacitance which is established between a pair of conductive fan blades 540, 542 and a pair of conductive flat plates 550, 552.

Referring to FIGS. 4 and 5, the fan 500 includes a centrally located shaft head 556 which is mechanically attached to the conductive fan blades 540, 542, so that, as the shaft head 556 rotates, the blades 540, 542 also rotate to circulate air. The shaft head 556 is attached to a rotatable shaft 560 (FIG. 7) which extends from the motor 530. Conductive lines 564, 566 are in electrical contact with the conductive fan blades 540, 542, respectively, and enter the motor 530 through the shaft 560. The motor 530 is described in greater detail with reference to FIG. 7 below.

The blades 540, 542 are situated so that they rotate above the pair of conductive flat plates 550, 552. The blades 540, 542 are spaced above the conductive flat plates 550, 552 so that the bottom surfaces of the blades 540, 542 are substantially parallel to the surfaces of the conductive flat plates 550, 552. In one embodiment, the bottom surfaces of the blades 540, 542 are substantially flat so that a relatively constant distance is maintained between the bottom surfaces of the fan blades 540, 542 and the surfaces of the flat plates 550, 552. The flat plates 550, 552 are electrically connected to the AC sources 510, 520 by means of conducting lines 570, 572, so that AC electrical energy can be applied to the flat plates 550, 552.

When a substantial portion of the areas of the blades 540, 542 are directly above the flat plates 550, 552, a significant electrical capacitance is established between the blades 540, 542 and the flat plates 550, 552. This capacitance may be calculated using Equation (1), where the perpendicular distance between the bottom surface of the blades 540, 542 and the surface of the flat plates 550, 552 is taken as an average and is assumed to be substantially constant. The permittivity constant, e, is determined by the material between the fan blades 540, 542 and the flat plates 550, 552 (e.g., air, liquid, etc.). It is also possible to coat the flat plates 550, 552 or the blades 540, 542 with an insulating material so as to modify the permittivity of the dielectric between the blades 540, 542 and the flat plates 550, 552. The permittivity of the insulating coating may be selected to produce a desired capacitance.

It has been found in practice that small variations occur in the perpendicular distances between the blades 540, 542 and the plates 550, 552 as the fan 500 rotates.

Although these variations occur, it has been found that relatively small variations in the perpendicular distances between the plates 550, 552 and the blades 540, 542 do not significantly change the total capacitance established between the plates 550, 552 and the blades 540, 542. This is because the variations in distance between the plates 550, 552, and the blades 540, 542 are equal in magnitude but opposite in direction. That is, as the blade 540, for example, moves closer to the plate 550 by a certain distance, the blade 542, since it is symmetrically located on the other side of the head 556 which acts as a fulcrum, moves farther away from the plate 552 by the same distance. Thus, the capacitance between the plate 550 and the blade 540 increases, while the capacitance between the plate 552 and the blade 542 decreases. It can be shown mathematically that, for small changes in distance, the total capacitance of these two effective capacitors in series remains substantially constant. Thus, the increase in capacitance between the one plate and blade compensates for the decrease in capacitance between the other plate and blade so that the total capacitance remains constant.

Due to the capacitance established between the flat plates 550, 552 and the blades 540, 542, AC electrical energy can be coupled from the stationary flat plates 550, 552 to the moveable blades 540, 542, and ultimately to the motor 530. The power coupled to the motor 530 is a function of the frequency of the applied AC energy, and the capacitance between the blades 540, 542 and the plates 550, 552. Thus, since it was shown that the overall capacitance remains constant, the power coupled to the motor 530 varies with the frequency of the applied AC energy only.

AC energy may be applied to the flat plates 550, 552 by the AC sources 510, 520, respectively, via lines 570, 572. The sources 510, 520 may provide any AC waveform which is capable, when rectified, of powering a DC motor. For example, in one advantageous embodiment, the AC sources 510, 520 provide a 800 V peak-to-peak square wave having a 50/50 duty cycle as shown in FIG. 6. Depending upon the particular application, however, it may be expedient to use a lower voltage such as 240 V peak-to-peak. The frequency supplied by the sources 510, 520 is advantageously within 20 Hz-100 Hz. As shown in FIG. 6, the voltages output by the sources 510, 520 are 180 degrees out of phase with one another. This removes the necessity for rectification circuitry for the DC motor 530, since a positive voltage of the same amplitude is always applied to one of the two plates 550, 552.

The AC electrical energy which is applied to the flat plates 550, 552, is then capacitively coupled to the conductive blades 540, 542. This AC energy is then conducted by the fan blades 540, 542 to the conducting lines 564, 566. This energy is then conducted to the motor 530, which causes the shaft 560 to rotate.

As the blades 540, 542 rotate, the blades pass over the surface of the flat plates 550, 552. Because an electrical capacitance is established only when the blades 540, 542 pass over the flat plates 550, 552, AC electrical energy can only be coupled from the flat plates 550, 552 to the blades 540, 542 in accordance with the cyclic rotation of the blades 540, 542. That is, AC energy applied to the flat plates 550, 552 is only coupled at those times when the blades 540, 542 rotate so that they are directly above the flat plates 550, 552. Although only a single pair of blades 540, 542 are shown, it will be appreciated by one skilled in the art that the actual embodiment of the fan 500 may include additional pairs of blades (e.g., three pairs) which are sized to provide continuous coverage of the plates 550, 552. In this manner, a capacitive link is always established between the blades and the plates 550, 552 so that a continuous supply of pulsed energy is provided to the fan motor 530.

As stated above, the power coupled to the DC motor 530 is a function of the frequency of the applied voltage. More specifically, the power coupled to the motor 530 varies in proportion to the frequency of the applied voltage. That is, as the frequency of the applied voltage increases, the power coupled to the motor 530 increases. Furthermore, since the speed of the DC motor 530 increases in proportion to the input power, the speed of the fan motor 530 increases as the frequency of the applied voltage increases. Thus, the speed of rotation of the fan 500 can be varied in accordance with the frequency of the voltage waveforms output by the sources 510, 520.

FIG. 7 is a cross-sectional schematic view of the motor 530 which shows the major structural elements of the motor 530. As shown in FIG. 7, the motor 530 includes the shaft 560 which runs down the center of the motor 530. The lines 566, 564 run down the shaft 560 into the motor 530, and form an electrically conductive loop 570 around the surface of the shaft 560. The shaft 560, including the loop 570, is supported by a bearing 575 which allows the shaft to rotate freely in a circular motion about its longitudinal axis. At least one pair of fixed magnets 580, 582 are also included within the motor 530. The magnets 580, 582 are arranged in North-South polar pairs so that a magnetic field (represented by the lines 585 in FIG. 7) is established across the loop 570.

When electrical current is caused to flow through the loop 570, the current interacts with the magnetic field 585 to produce a force which is perpendicular to the plane in which the current flows and field exists (i.e., the plane of the page in this case). This force causes the shaft 560 to rotate so that the shaft head 556, and the blades 540, 542 also rotate. Thus, the present invention provides a means for capacitively coupling electrical energy from a stationary source to a rotating motor.

FIG. 8 is an electrical schematic view showing the equivalent circuit of the fan embodiment of the invention. The equivalent circuit 800 comprises a series electrical path including the source 510 in series with an effective capacitor 810, in series with the fan motor 530, in series with an effective capacitance 812, in series with the source 520.

The capacitors 810, 812 comprise the blades 540, 542 and the flat plates 550, 552. Thus, the effective capacitances of the capacitors 810, 812 may be calculated using equation (1) as detailed above with reference to FIG. 1, where the permittivity, e, of the dielectric may be calculated as a function of the permittivity of the air or liquid, as well as any insulating coating, between the blades 540, 542 and the flat plates 550, 552. It should be noted that the capacitors 810, 812 become open circuits when the blades 540, 542 rotate so that they are not proximate to the flat plates 550, 552.

The fan embodiment of the present invention therefore provides an apparatus and method for capacitively coupling AC electrical energy to an electrical motor without creating a physical, frictional contact by means of brushes or the like. It should be noted that the fan embodiment described above is only a particular example of a capacitively coupled DC motor which may be powered in accordance with the teachings of the present invention. Therefore, the foregoing description should be construed as merely illustrative and in no way restrictive to the spirit and scope of the present invention. For example, the clock embodiment of the invention may be modified to employ only a neon hour hand, or likewise modified to include an additional neon second hand. An electrically powered motor may also be employed in the clock embodiment in place of the spring clock movement. The fan embodiment may also be modified to operate using only a single voltage source. Furthermore, other embodiments of the invention may be conceived wherein a device includes moving parts which may be utilized to conduct AC electrical energy to a power consuming device. For example, a grandfather clock including a conductive pendulum, or a merry-go-round may also be modified to incorporate the teachings of the present invention. Accordingly, the scope of the invention, including all embodiments and their equivalents, should be understood in light of the appended claims.

I claim:

1. An apparatus for coupling AC electrical energy from a stationary source to a moving, power-consuming object comprising:
    means for receiving electrical energy from a source of alternating electrical current;
    a stationary, electrically-conductive surface which is electrically connected to said means for receiving electrical energy;
    a moveable, electrically-conductive surface, said moveable surface being proximate and substantially parallel to said stationary surface so that an electrical capacitance is established between said stationary and said moveable surface;
    a dielectric material situated between said stationary and said moveable plate; and
    a power-consuming, electrical device which is electrically connected to said moveable surface to receive alternating electrical current via said stationary and moveable conductive surfaces.

2. An apparatus as defined in claim 1, wherein said electrical device comprises a neon tube.

3. An apparatus as defined in claim 1, wherein said electrical device comprises an electrical motor.

4. A method of coupling AC electrical energy from a stationary source to a moving, power-consuming object comprising the steps of:
    receiving AC electrical energy from said stationary source of alternating electrical current;
    connecting a stationary, electrically-conductive surface to said source of alternating electrical current;
    establishing an electrical capacitance between a moveable, electrically-conductive surface and said stationary surface, said moveable surface being proximate and substantially parallel to said stationary surface;
    situating a dielectric material between said stationary and said moveable plate; and
    connecting a power-consuming, electrical device to said moveable surface to receive alternating electrical current via said stationary and moveable conductive surfaces.

5. A method as defined in claim 4, wherein said power consuming electrical device comprises a neon tube.

6. A method as defined in claim 4, wherein said power consuming electrical device comprises an electrical motor.

* * * * *